United States Patent [19]
Sasaki et al.

[11] Patent Number: 5,226,173
[45] Date of Patent: Jul. 6, 1993

[54] INTEGRATED DATA PROCESSOR HAVING MODE CONTROL REGISTER FOR CONTROLLING OPERATION MODE OF SERIAL COMMUNICATION UNIT

[75] Inventors: Hisao Sasaki, Tachikawa; Takeshi Miyazaki, Kokubunji; Shiro Baba, Tokorozawa; Kunihiko Nakada, Kodaira; Yasushi Akao, Kokubunji, all of Japan

[73] Assignee: Hitachi, Ltd., Tokyo, Japan

[21] Appl. No.: 850,856

[22] Filed: Mar. 13, 1992

Related U.S. Application Data

[63] Continuation of Ser. No. 347,659, May 5, 1989, abandoned.

[30] Foreign Application Priority Data

May 6, 1988 [JP] Japan ............... 63-109962

[51] Int. Cl.⁵ .................. G06F 13/42; G06F 3/00
[52] U.S. Cl. ........................ 395/800; 395/200; 395/325; 364/284.4; 364/242.94; 364/222.2; 364/232.8; 364/232.9; 364/240; 364/247; 364/239; 364/DIG. 1
[58] Field of Search .......... 364/DIG. 1, DIG. 2; 395/275, 800, 200, 325, 275, 250; 340/825, 825.03, 825.04; 375/7; 370/61, 85.1

[56] References Cited

U.S. PATENT DOCUMENTS

| | | | |
|---|---|---|---|
| 4,071,887 | 1/1978 | Daly et al. | 364/200 |
| 4,346,440 | 8/1982 | Kyn et al. | 364/200 |
| 4,365,293 | 12/1982 | Holtz | 364/200 |
| 4,379,327 | 4/1983 | Tietjen et al. | 364/200 |
| 4,388,683 | 6/1983 | Beifuss et al. | 364/200 |
| 4,393,461 | 7/1983 | Holtey et al. | 364/900 |
| 4,407,014 | 9/1983 | Holtey et al. | 364/200 |
| 4,453,228 | 6/1984 | Loskorn | 364/900 |
| 4,467,445 | 8/1984 | Mueller et al. | 364/900 |
| 4,783,778 | 11/1988 | Finch et al. | 370/60 |
| 4,887,075 | 12/1989 | Hirasawa | 340/825.03 |
| 4,954,950 | 9/1990 | Freeman et al. | 364/200 |
| 4,989,135 | 1/1991 | Miki | 364/200 |

FOREIGN PATENT DOCUMENTS

| | | |
|---|---|---|
| 59-181855 | 10/1984 | Japan . |
| 61-107842 | 5/1986 | Japan . |
| 61-270953 | 12/1986 | Japan . |
| 62-2744 | 1/1987 | Japan . |
| 62-224143 | 10/1987 | Japan . |

OTHER PUBLICATIONS

"NEC Multi-Protocol Serial Controller MPD7201 AC/D User's Manual" published in 1987, pp. 1-70 (Japanese version and English translation of these pages).

Primary Examiner—Michael R. Fleming
Assistant Examiner—Gopal C. Ray
Attorney, Agent, or Firm—Antonelli Terry Stout & Kraus

[57] ABSTRACT

A reception unit for providing data supplied from a serial input circuit to an inner bus and a transmission unit for providing the data supplied from the inner bus to a serial output circuit hold at least two types of control procedures selected from HDLC procedure, BISYNC procedure and start-stop synchronous procedure as control procedures for data transmission/reception, and the control procedures held by these units can be selected alternatively based on a mode control data written in a mode control register by a processor.

7 Claims, 4 Drawing Sheets

INTEGRATED DATA PROCESSOR HAVING MODE CONTROL REGISTER FOR CONTROLLING OPERATION MODE OF SERIAL COMMUNICATION UNIT

This application is a continuation of application Ser. No. 07/347,659, filed May 5, 1989 now abandoned.

BACKGROUND OF THE INVENTION

The present invention relates to the technical field of data processing and serial communication, for example, to effective technology to be applied to a microcomputer having a serial communication interface. Since microcomputers can constitute desired sequential logic in programming by software, processing of high degree can be performed in a wide application field and some microcomputer have a serial input/output circuit such as data processing terminal or modem to enable data transmission/reception with the outside in a bit serial manner.

Data transmission control procedures for transmission/reception of data in bit serial manner include various sorts of procedures such as the well-known high level data link control (HDLC) procedure and the binary synchronous communication (BSC or BI-SYNC) system, and further a start-stop synchronous procedure. However, a serial input/output circuit installed in a microcomputer or the like in the prior art merely supports one among the above-mentioned data transmission control procedures, for example, i8044 described in "Distributed Control Modules Data Book" published by Intel Company in 1984 only supports the HDLC procedure. The above-mentioned procedures are described on pp. 337, 338, 625 and 626 in "MICROCOMPUTER HANDBOOK" published by Ohm Company in 1985. As low cost of logic LSIs such as a microcomputer advances, these devices are apt to be multifunctional. Particularly paying attention to a serial interface function, since the above-mentioned three sorts of data transmission control procedures have the wide application field corresponding to respective advantages, the present inventor has found that these devices must be able to support a plurality of data transmission control procedures also to a serial input/output circuit contained in a data processing LSI such as a microcomputer so that multifunctional serial communication as required can be attained.

Further in this case, since the LSI chip cannot be made large without limitation from the viewpoint of manufacturing and economy, when a plurality of data transmission control procedures are supported, such condition must be also considered that the logical scale can be minimized.

SUMMARY OF THE INVENTION

An object of the invention is to provide a data processor which can perform multifunctional serial communication to request of the serial data transmission.

Another object of the invention is to provide a data processor wherein such request can be realized at the minimum logical scale.

The foregoing and other objects and novel features of the invention will be apparent from the description of the specification and the accompanying drawings Outline of typical invention among those disclosed in the present application will be briefly described as follows.

That is, a reception means for providing data supplied from a serial input circuit to an inner bus and a transmission means for providing the data supplied from the inner bus to a serial output circuit hold at least two sorts of control procedures among HDLC procedure, BI-SYNC procedure and start-stop synchronous procedure as control procedures for the data transmission/reception, and the procedures held by these means can be selected alternatively based on command of a processor. The selection command can be performed based on operation mode signal set to a control register by the processor. A reception buffer and a reception shift register included in the reception means, and a transmission buffer and a transmission register included in the transmission means can possess hardware thereof in common use irrespective of the selected data transmission control procedure.

According to the above-mentioned means, plural sorts of data communication control procedures can be responded selectively, thereby a data processor to perform multifunctional serial communication to request of the serial data transmission can be attained. Further, a part of the hardware is used commonly irrespective of the data transmission control means, thereby the multifunctional serial communication can be realized at the minimum logical scale.

DESCRIPTION OF THE PREFERRED EMBODIMENTS

Figure 2:
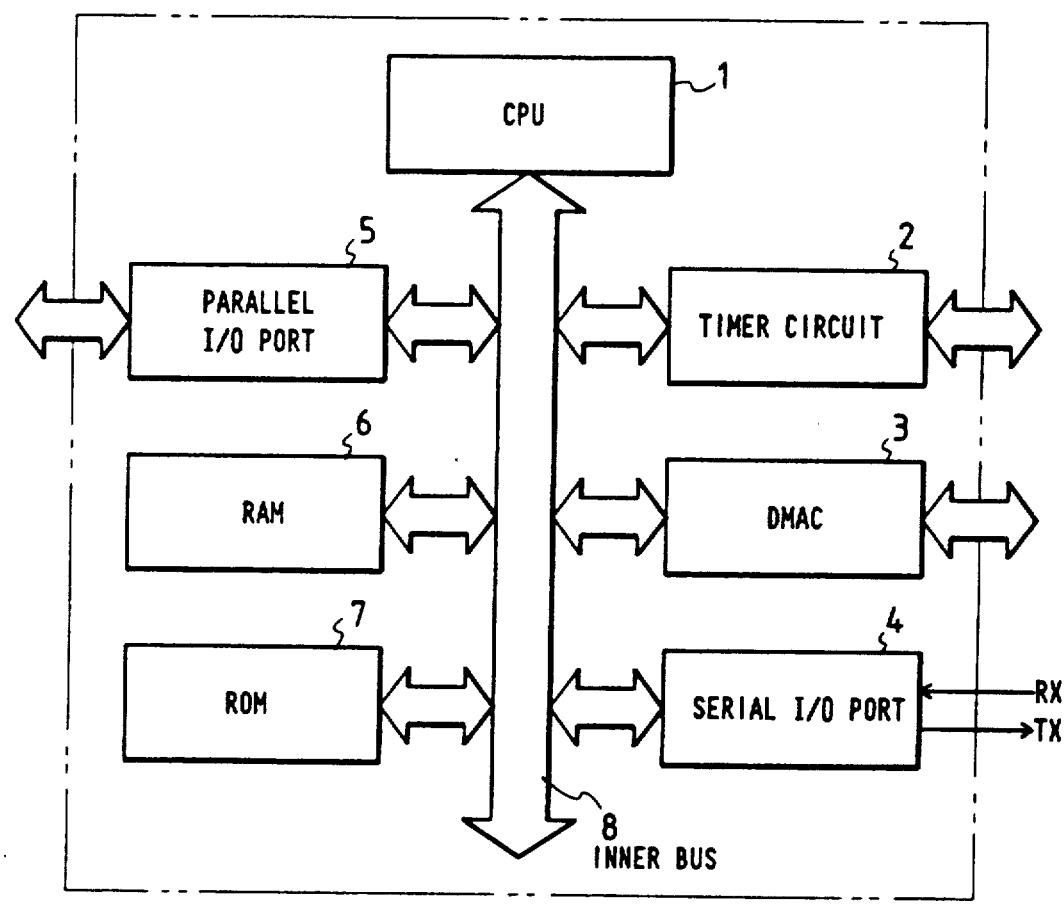
FIG. 2 is a block diagram illustrating outline of a microcomputer as an embodiment of the invention.

FIG. 2 shows an outline of a microcomputer as an embodiment of the invention. The microcomputer shown in FIG. 2 is formed on one semiconductor substrate such a silicon substrate by known semiconductor integrated circuit manufacturing technology.

The microcomputer shown in FIG. 2, although not particularly limited thereto, comprises a central processor (CPU) 1, a timer circuit 2, a direct memory access controller (DMAC) 3, a serial I/O port 4 performing serial communication as an interface with the outside through a transmission circuit Tx and a reception circuit Rx, a parallel I/O port 5, a random access memory (RAM) 6 and a read only memory (ROM) 7 respectively connected to an inner bus 8.

The serial I/O port 4 holds HDLC procedure, BI-SYNC procedure and start-stop synchronous procedure as control procedure or communication logic to perform data transmission/reception with the outside in a bit serial manner, and the control procedures held can be selected alternatively based on a command of the CPU 1.

Figure 3:
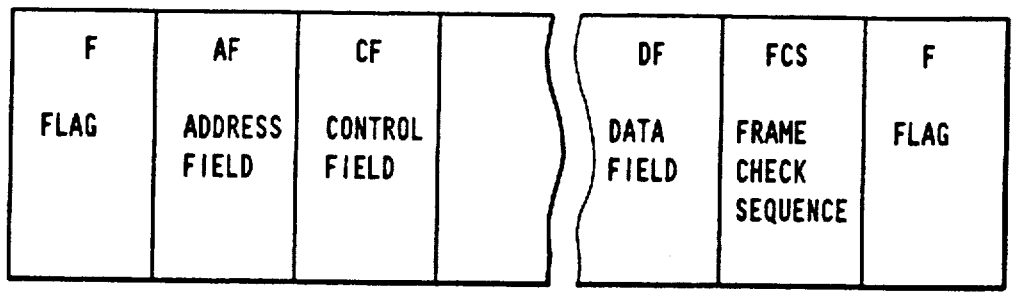
FIG. 3 is an explanation diagram illustrating an example of frame constitution according to HDLC procedure.

In this case, frame constitution according to the HDLC procedure as shown in FIG. 3 for example, is composed of a flag F indicating the start of the frame, an address field AF indicating the self station or the opposite station, a control field CF indicating the type of frame, a data field DF in integer byte constitution, a frame check sequence FCS for transmission error inspection and a flag F indicating the end of the frame.

Figure 4:
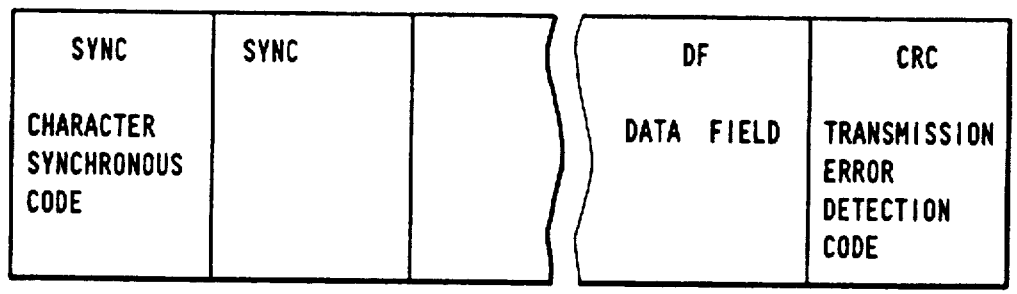
FIG. 4 is an explanation diagram illustrating an example of frame constitution according to BI-SYNC procedure.

Frame constitution according to the BI-SYNC procedure as shown in FIG. 4 for example, is composed of a character synchronous code SYNC inserted at one piece or more for indicating the start of the frame, a data field DF succeeding the code SYNC and a transmission error detection code CRC.

Figure 5:
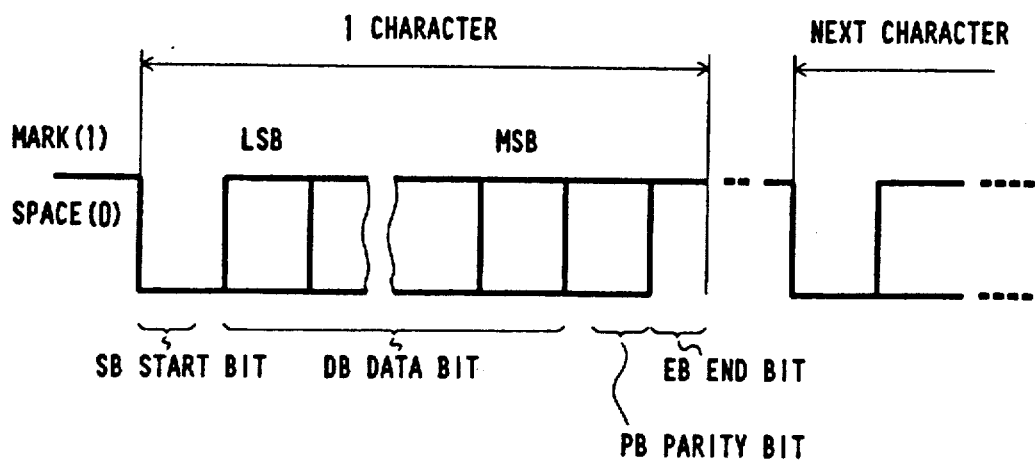
FIG. 5 is an explanation diagram illustrating an example of data format according to start-stop synchronous procedure.

Data format according to the start-stop synchronous procedure as shown in FIG. 5 for example is provided as a character unit, and one character is composed of a start bit SB, a data bit DB, a parity bit PB and an end bit or stop bit EB.

Figure 1:
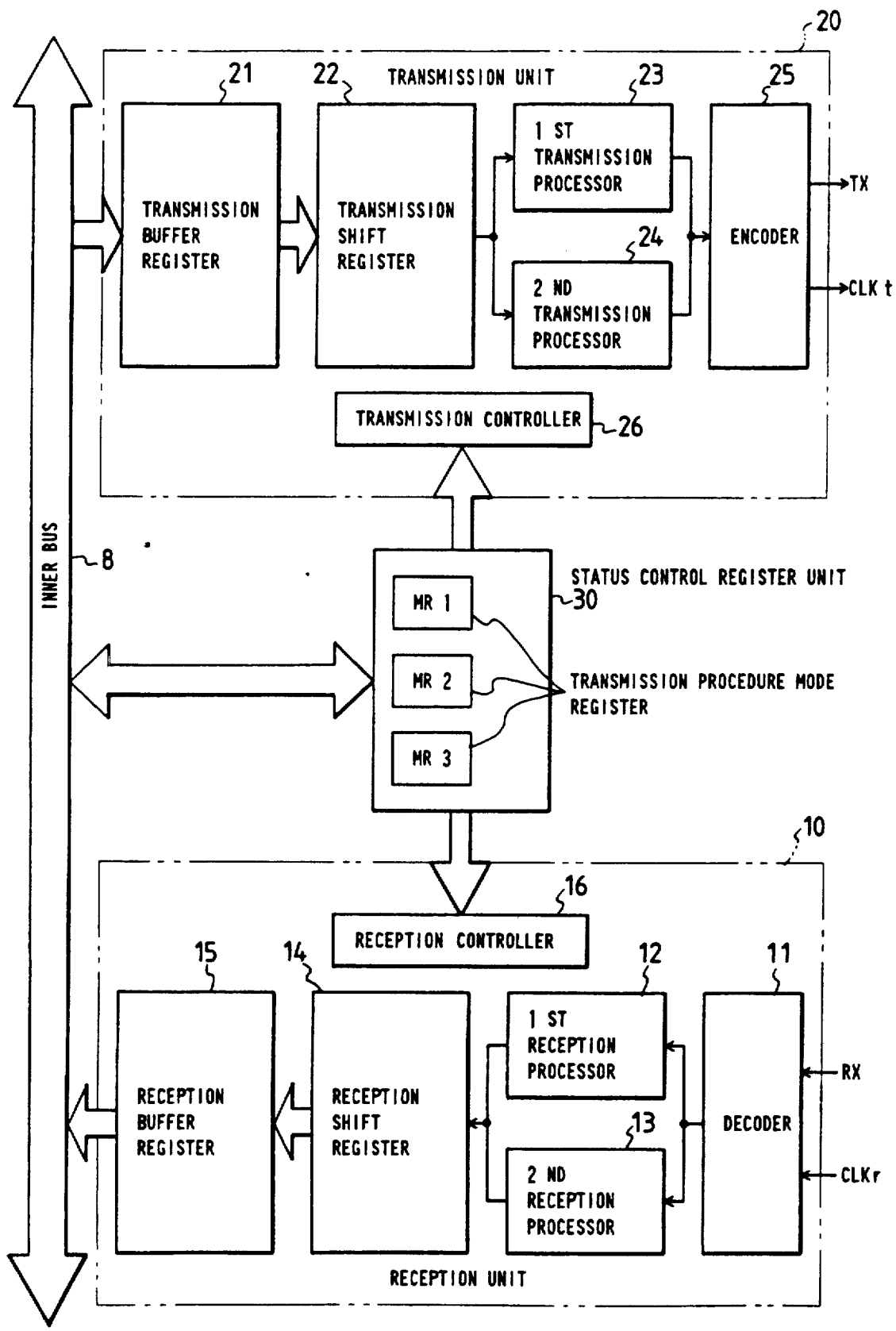
FIG. 1 is a block diagram illustrating a detailed example of a serial I/O port applied to a microcomputer as an embodiment of the invention.

FIG. 1 is a block diagram illustrating a detailed example of the serial I/O port 4.

The serial I/O port 4 broadly comprises a reception unit 10 for providing data supplied from the reception circuit Rx to the inner bus 8, a transmission unit 20 for providing the data supplied from the inner bus 8 to the transmission circuit Tx, and a status control register unit 30 in which various sorts of information and status information are held.

The reception unit 10 comprises a decoder 11 for decoding information supplied from the reception circuit Rx into prescribed format such as NRZ (non-return-to-zero) format or biphase format in a base band system in synchronization with a clock CLKr, a first reception processor 12 and a second reception processor 13 for receiving the information decoded by the decoder 11 and processing it, a reception shift register 14 where information outputted from the first reception processor 12 or the second reception processor 13 selected in operation alternatively in response to the data transmission control procedure adopted selectively in operation of the serial I/O port 4 is converted from series data into parallel data, a reception buffer register 15 for storing the parallel data supplied from the reception shift register 14 and supplying it to the inner bus 8, and a reception controller 16 for controlling each of the above-mentioned functional blocks in response to the data transmission control procedure adopted selectively in operation of the serial I/O port 4.

The transmission unit 20 comprises a transmission buffer register 21 for receiving data to be transmitted from the inner bus 8 and storing it, a transmission shift register 22 for converting the parallel data supplied from the transmission buffer register 21 into series data, a first transmission processor 23 and a second transmission processor 24 for receiving the series data supplied from the transmission shift register 22 and processing it, an encoder 25 where information outputted from the first transmission processor 23 or the second transmission processor 24 selected in operation alternatively in response to the data transmission control procedure adopted selectively in operation of the serial I/O port 4 is decoded from prescribed format such as NRZ format or biphase format in the base band system in synchronization with a clock CLKt, and a transmission controller 26 for controlling each of the above-mentioned functional blocks in response to the data transmission control procedure adopted selectively in operation of the serial I/O port 4.

The status control register unit 30 comprises various sorts of status registers or flag registers indicating state of the modem connected to the reception unit 10 and the transmission unit 20 and further the serial I/O port 4, and various sorts of control registers determining the operation mode of the serial I/O port 4.

For example, various sorts of status registers or flag registers include, although not shown, registers for transmission error status indicating presence/absence of parity error detected by the first reception processor 12 or presence/absence of data transmission error detected by the second reception processor 13, frame error status indicating presence/absence of frame error detected by the second reception processor 13, data carrier detect status indicating whether the modem commands reset of operation to the reception unit 10 or not, full/empty status indicating empty state of the reception buffer register 15, and full/empty status indicating empty state of the transmission buffer register 21.

Control registers include three transmission procedure mode registers MR1~MR3 for commanding the transmission controller 26 and the reception controller 16 to select which control logic of start-stop synchronous procedure, HDLC procedure or BI-SYNC procedure, and further include, although not shown, registers for receive enable determining whether the reception operation by the reception unit 10 is possible or not, transmit enable determining whether the transmission operation by the transmission unit 20 is possible or not, and request-to-send requesting the transmission start to the modem or the like.

The transmission procedure mode registers MR1~MR3 are subjected to the initial setting respectively by data supplied from the CPU 1 through the inner bus 8. For example, when "1" is set to the mode register MR1, the transmission controller 26 and the reception controller 16 select the control logic in response to the start-stop synchronous procedure and control the reception unit 10 and the transmission unit 20. When "1" is set to the mode register MR2, the transmission controller 26 and the reception controller 16 select the control logic in response to the BI-SYNC procedure and control the reception unit 10 and the transmission unit 20. Also when "1" is set to the mode register MR3, the transmission controller 26 and the reception controller 16 select the control logic in response to the HDLC procedure and control the reception unit 10 and the transmission unit 20.

The reception controller 16 is provided with the control logic adapting the operation of the reception unit 10 the start-stop procedure, the HDLC procedure and the BI-SYNC procedure, and the control logic is selected alternatively in response to the set state of the transmission procedure mode registers MR1~MR3.

In the reception unit 10, the decoder 11, the reception shift register 14 and the reception buffer register 15 are provided as hardware used in common irrespective of the control logic adopted in the reception controller 16.

Operation of the first reception processor 12 is selected corresponding to the control logic when the start-stop synchronous procedure is adopted in the reception controller 16. If the operation of the first reception processor 12 is selected, the first reception processor 12 detects start bit SB and end bit EB and recognizes one character from information supplied according to the start-stop synchronous procedure, and discriminates transmission error of the data bit DB succeeding the start bit SB per character based on the parity bit PB and supplies the information in character unit to the reception shift register 14.

Operation of the second reception processor 13 is selected when the control logic indicates that the HDLC procedure or the BI-SYNC procedure is adopted in the reception controller 16. That is, the second reception processor 13 is provided with hardware which can be commonly used in processing of the series data supplied according to the HDLC procedure and the series data supplied according to the BI-SYNC procedure. If the operation of the second reception processor 13 is selected by the control logic in response to the HDLC control procedure, the second reception processor 13 detects the start and the end of one frame by the flag F of the series data supplied according to the HDLC procedure and discriminates whether the frame is directed to the self station or not from the address field AF, and performs operation regarding whether the transmission error exists or not to the frame directed to the self station based on the frame sequence FCS and supplies the reception shift register 14 with the content of the control field CF and the data field DF or the like. Also if the operation of the second reception processor 13 is selected by the control logic in response to the BI-SYNC procedure, the second reception processor 13 detects the character synchronous code SYNC of the series data supplied according to the BI-SYNC procedure thereby recognizing the start of the data field DF, and subsequently discriminates whether the transmission error exists or not based on the transmission error detection code CRC and then supplies the reception shift register 14 with information of the data field DF or the like.

The transmission controller 26 is provided with the control logic adapting the operation of the transmission unit 20 to the start-stop synchronous procedure, the HDLC procedure or the BI-SYNC procedure, and the control logic is selected alternatively in response to the set state of the transmission procedure mode registers MR1~MR3.

In the transmission unit 20, the transmission buffer register 21, the transmission shift register 22 and the encoder 25 are provided as hardware used in common irrespective of the control logic adopted selectively in the transmission controller 26.

Operation of the first transmission processor 23 is selected when the control logic indicates that the start-stop synchronous procedure is adopted in the transmission controller 26. If the operation of the first transmission processor 23 is selected, the first transmission processor 23 adds the start bit SB, the parity bit PB and the end bit EB to the series data supplied from the transmission shift register 22, and forms the data format adapted to the start-stop synchronous procedure and supplies it to the encoder 25.

Operation of the second transmission processor 24 is selected when the control logic indicates that the HDLC procedure or the BI-SYNC procedure is adopted in the transmission controller 26. That is, the second transmission processor 24 is provided with hardware which can be used in common both in the frame formation according to the HDLC procedure and in the frame formation according to the BI-SYNC procedure. If the operation of the second transmission processor 24 is selected by the control logic in response to the HDLC procedure, the second transmission processor 24 forms the frame check sequence FCS based on the series data supplied from the transmission shift register 22, and adds the frame check sequence FCS and the flag F indicating the start and the end of one frame or the like and forms the flag according to the HDLC procedure and supplies it to the encoder 25. Also if the operation of the second transmission processor 24 is selected by the control logic in response to the BI-SYNC procedure, the second transmission processor 24 forms the transmission error detection code CRC based on the series data supplied from the transmission shift register 22, and adds the transmission error detection code CRC and the character synchronous code SYNC or the like and forms the frame according to the BI-SYNC procedure and supplies it to the encoder 25.

According to the above-mentioned embodiments, effects are obtained as follows.

(1) In a system to which the microcomputer of the embodiment is applied, any of the start-stop synchronous procedure, the HDLC procedure or the BI-SYNC procedure can be selected alternatively as the data transmission control procedure in the case of performing serial communication with the microcomputer through the serial I/O port 4. Thereby the microcomputer of the embodiment is not limited in the transmission control procedure to request of the serial data transmission, and can realize a multifunctional serial communication. Consequently, whatever data transmission control procedure is adopted in the desired system, the inconvenience and further the troublesome work can be eliminated in adopting different microcomputers in response to the data transmission control procedure or in supplying various sorts of microcomputers different in the serial interface function.

(2) Since the decoder 11, the reception shift register 14 and the reception buffer register 15 included in the reception unit 10, and the encoder 25, the transmission shift register 22 and the transmission buffer register 21 included in the transmission unit 20 have hardware used in common irrespective of the data transmission control procedure selected alternatively and an independent control unit is not constituted for each data transmission control procedure, under condition that the LSI chip cannot be made large without limitation from the viewpoint of manufacturing and economy, the multifunctional serial communication can be realized in the minimum logical scale.

The invention made by the inventor has been described specifically based on the embodiments, however, the present invention is not limited by the embodiments and various modifications may be done in scope without departing from the subject matter thereof.

For example, peripheral module included in the microcomputer is not limited by the embodiments but may be suitably modified corresponding to its required specification or the like. Also the data transmission control procedures capable of being selected alternatively by the microcomputer need not be all of the HDLC procedure, the BI-SYNC procedure and the start-stop synchronous procedure, but if the alternative selection is possible among at least two of these procedures, the multifunctional serial communication can be realized in similar manner to the embodiments and further the function can be realized in the minimum logical scale.

Figure 6:
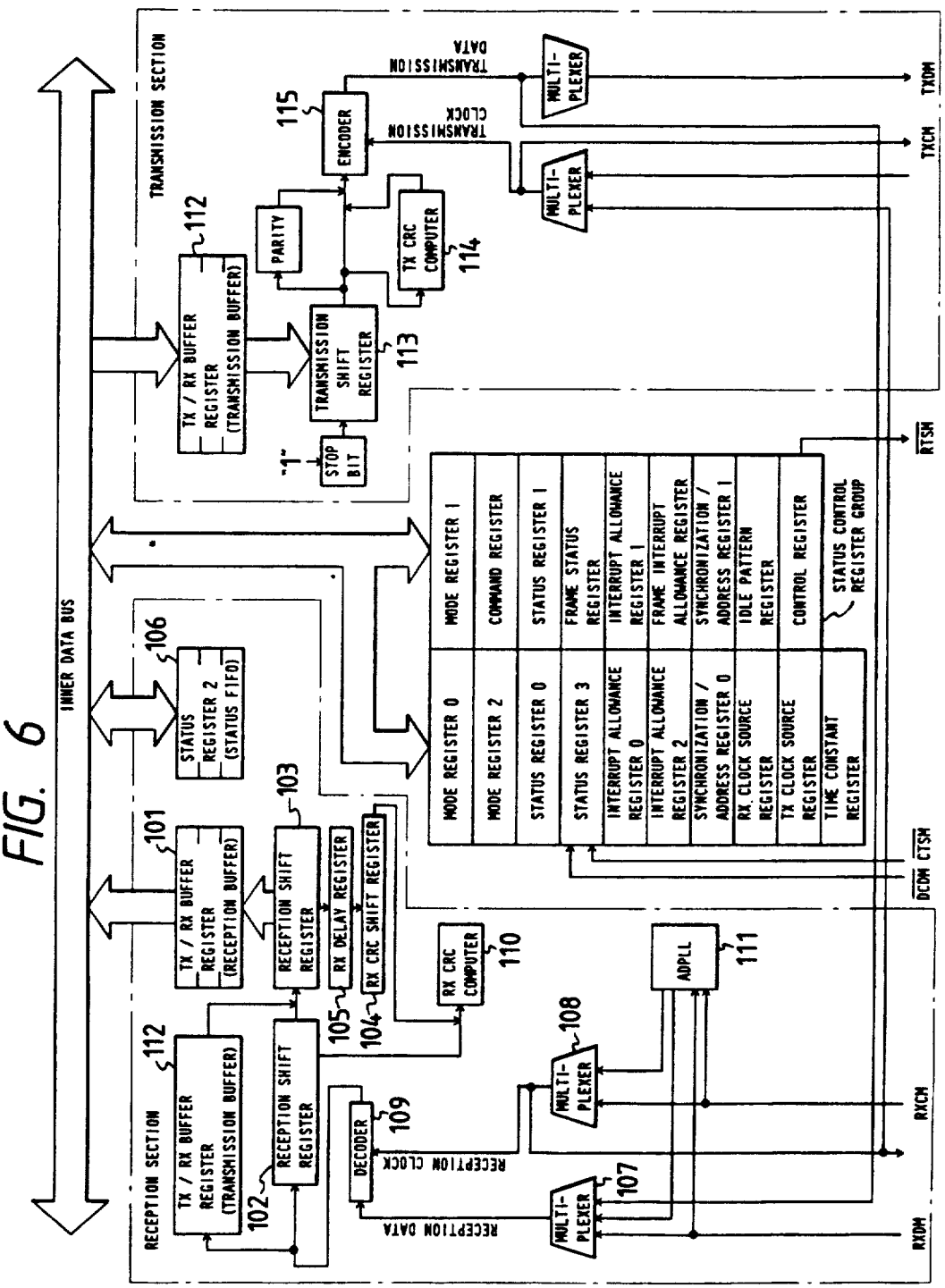
FIG. 6 is a block diagram illustrating another detailed example of a serial I/O port applied to a microcomputer as an embodiment of the invention.

FIG. 6 shows another example of a serial I/O port applied to a microcomputer as an embodiment of the invention.

A reception section comprises a reception buffer 101 of three stages in FIFO form, eight-bit shift registers 102, 103, 104, and one delay register 105.

The reception section further comprises a status FIFO 106 of six-bit width in order to hold the status attendant on data such as parity error or framing error.

Input data is taken from RXDM terminal and enters the inside through a multiplexer 107 and a decoder 109. Passage of data in the inside varies depending on the operation modes (start-stop synchronous mode, byte synchronous mode, bit synchronous mode).

In the start-stop synchronous mode, the input data is subjected to parity check or the like, and then enters the reception shift register 103 directly. After finishing the reception of one character, data is transmitted from there to the reception buffer 101. CPU or DMAC can read data from the reception buffer 101 through the inner data bus.

In the byte synchronous mode, the input data enters the reception shift register 102, and is branched from there in passage to a next stage within the reception shift register 102 and passage entering the reception shift register 103 directly.

Data within the reception shift register 102 is used to detect the SYN character. Also data entering the reception shift register 103 is transmitted to the reception buffer 101. For the CRC calculation, the reception data is also transmitted to a RX CRC computer 110 through a RX delay register 105 and the RX CRC shift register 104.

Status as result of the CRC calculation is set to status register 2 in status FIFO 106. CPU or DMAC can read the reception data and the reception status through the inner data bus.

In the bit synchronous mode, the input data enters the reception shift register 102 where "0" deletion and detection of flag, abort, idle are performed. Data is branched from there in passages directed to the register of next stage within the reception shift register 102 and the RX CRC computer 110. A result of the CRC calculation is set to the status register 2 in similar manner to the byte synchronous mode. In addition, clock signal for the operation of the reception section is formed by an ADPLL (advanced digital PLL) 111.

The transmission section comprises a transmission buffer 112 of three stages in FIFO form and one transmission shift register 113. Also the transmission section contains a CRC computer 114 in a similar manner to the reception section. The output data is written in the transmission buffer through the inner data bus by the CPU or DMAC. Information required to constitute the frame in each operation mode is added to the transmission data, which is then is outputted through an encoder 115 from TXDM terminal.

The status control register group deals with not only selection of the the communication means but also modem control signal. For example, $\overline{\text{RSTM}}$ (Request to send) is transmission request signal, and $\overline{\text{CTSM}}$ (Clear to send) is signal indicating possibility of transmission, and further $\overline{\text{DCDM}}$ (Data Carrier Detect) is reception carrier detection signal.

Description of the embodiment of FIG. 6 in other specific operation explanation is incorporated by description in "HD64180S NPU hardware manual" p.111~p.118 published by Hitachi, Ltd. in July 1988.

Although the invention made by the inventor has been described mainly in the case of application to the general-purpose microcomputer having the serial I/O port being the utilization field as the background of the invention, the invention is not limited to this but can be widely applied to the LSI for communication or control and a protocol processor. The present invention can be applied at least to that under condition of including the serial communication interface means and the processor commonly connected to the inner bus.

What is claimed is:

1. An integrated communication processor formed on one semiconductor substrate, comprising:
   a bus;
   a central processing unit coupled to the bus;
   a transmission unit coupled to the bus and including sending means for sending serial data to outside of the integrated communication processor in accordance with one of a plurality of operation modes which include a first mode for high level data link control procedure, a second mode for binary synchronous communication procedure, and a third mode for start-stop synchronous procedure, the transmission unit further including transmission control means coupled to the sending means for controlling an operation mode of the sending means;
   a reception unit coupled to the bus and including receiving means for receiving serial data from outside of the integrated communication processor in accordance with one of a plurality of operation modes which include a first mode for high level data link control procedure, a second mode for binary synchronous communication procedure, and a third mode for start-stop synchronous procedure, the reception unit further including reception control means coupled to the receiving means for controlling an operation mode of the receiving means; and
   a mode control register having an input coupled to the bus and an output coupled to the transmission control means and the reception control means, the content of said mode control register being written by the central processing unit via the bus,
   wherein said mode control register includes means for sending to the transmission control means and the reception control means an output signal for controlling the operation mode of said sending means and said receiving means in response to the content of said mode control register,
   wherein said transmission control means includes means responsive to the output signal of the mode control register for controlling the operation mode of said sending means so that the operation mode of the transmission unit is a selected one of the first mode, the second mode, and the third mode; and
   wherein said reception control means includes means responsive to the output signal of the mode control register for controlling the operation mode of said receiving means so that the operation mode of the reception unit is a selected one of the first mode, the second mode, and the third mode.

2. In an integrated microcomputer, including a bus, a central processing unit coupled to the bus, and a serial communication unit coupled to the bus for sending and receiving serial data to and from outside of the integrated microcomputer, the integrated microcomputer comprising, on a single semiconductor substrate:
   sending means in said serial communication unit for sending serial data selectively in one of a first mode for high level data link control procedure, a second mode for binary synchronous communication procedure, and a third mode for start-stop synchronous procedure;

receiving means in said serial communication unit for receiving serial data selectively in one of a first mode for high level data link control procedure, a second mode for binary synchronous communication procedure, and a third mode for start-stop synchronous procedure; and mode control register means having an input coupled to the bus and an output coupled to said sending means and said receiving means in the serial communication unit for storing mode control data which is written in said mode control register means by the central processing unit via the bus, wherein the mode control register means sends an output signal based on the mode control data to said sending means and said receiving means in the serial communication unit so as to operate the serial communication unit in one mode selected from the first to third modes.

3. In an integrated protocol processor including, on a single semiconductor substrate, an input terminal for receiving input serial data from outside the integrated protocol processor, an output terminal for supplying output serial data to the outside of the integrated protocol processor, a bus, a central processing unit coupled to the bus, and a serial communication unit coupled to the bus and to said input and output terminals for receiving the input serial data from said input terminal and for sending the output serial data to said output terminal, the integrated protocol processor comprising:

sending means in said serial communication unit for sending serial data selectively in one of a first operating mode for high level data link control procedure, a second operating mode for binary synchronous communication procedure, and a third operating mode for start-stop synchronous procedure;

receiving means in said serial communication unit for receiving serial data selectively in one of a first operating mode for high level data link control procedure, a second operating mode for binary synchronous communication procedure, and a third operating mode for start-stop synchronous procedure; and mode control register means having an input coupled to the bus and an output coupled to said sending means and said receiving means in the serial communication unit for storing mode control data which is written by the central processing unit into said mode control register means via the bus, wherein the mode control register means sends an output signal based on the mode control data to said sending means and said receiving means in the serial communication unit so as to operate the serial communication unit in one operating mode selected from the first to third operating modes.

4. In an integrated protocol processor including, on a single semiconductor substrate, an input terminal for receiving input serial data from outside the integrated protocol processor, an output terminal for supplying output serial data to the outside of the integrated protocol processor, a bus, a central processing unit coupled to the bus, a direct memory access controller coupled to the bus, a timer circuit coupled to the bus, and a serial communication unit coupled to the bus and to the input and output terminals for receiving the input serial data from the input terminal and for sending the output serial data to the output terminal, the integrated protocol processor comprising:

sending means in said serial communication unit for sending serial data selectively in one of a first operating mode for high level data link control procedure, a second operating mode for binary synchronous communication procedure, and a third operating mode for start-stop synchronous procedure;

receiving means in said serial communication unit for receiving serial data selectively in one of a first operating mode for high level data link control procedure, a second operating mode for binary synchronous communication procedure, and a third operating mode for start-stop synchronous procedure; and mode control register means having an input coupled to the bus and an output coupled to said sending means and said receiving means in the serial communication unit for storing mode control data which is written by the central processing unit into said mode control register means via the bus, wherein the mode control register means sends an output signal based on the mode control data to said sending means and said receiving means in the serial communication unit so as to operate the serial communication unit in one operating mode selected from the first to third operating modes.

5. A data processor formed on one semiconductor substrate, comprising:

an inner bus;

a CPU coupled to said inner bus;

a serial communication interface unit coupled to said inner bus and including a reception unit for converting externally generated serial data into parallel data to be fed to said inner bus, a transmission unit for converting parallel data fed from said inner bus into serial data to be fed to the outside of said data processor, transmission control means coupled to said transmission unit for controlling an operation mode of said transmission unit, and reception control means coupled to said reception unit for controlling an operation mode of said reception unit, wherein said transmission unit and said reception unit are operable in at least two operating modes selected from a first operating mode for high level data link control procedure, a second operating mode for binary synchronous communication, and a third operating mode for start-stop synchronous procedure; and mode control register means having an input coupled to said inner bus and an output coupled to said transmission control means and said reception control means in said serial communication interface unit for storing mode control data which is written by said CPU into said mode control register means via said inner bus, wherein said mode control register means sends an output signal based on the mode control data to said transmission control means and said reception control means in said transmission unit and said reception unit;

wherein said transmission control means is responsive to said output signal of said mode control register means for generating output signals for controlling an operation mode of said transmission unit to select one operating mode from said at least two operating modes; and wherein said reception control means is responsive to said output signal of said mode control register means for generating output signals for controlling an operation mode of said reception unit to select one operating mode from said at least two operating modes.

6. A data processor as set forth in claim 5, wherein said transmission unit includes:

transmission buffer means for receiving data to be transmitted from the inner bus and for storing the received data, conversion means for converting parallel data supplied from the transmission buffer means into serial data, and transmission data processing means for receiving serial data supplied from the conversion means and processing it, wherein said transmission data processing means includes a first transmission processor and a second transmission processor, and wherein said transmission control means operates to select one of said first and second transmission processors alternatively in response to the mode control data in the mode control register means.

7. A data processor as set forth in claim 6, wherein said reception unit includes decoding means for decoding said externally generated serial data into a prescribed format, and reception data processing means coupled to the decoding means for receiving output data of the decoding means and processing said output data, wherein said reception data processing means includes a first reception processor and a second reception processor, and wherein said reception control means operates to select one of said first and second reception processors alternatively in response to the mode control data in the mode control register means.

* * * * *